US012132822B2

(12) United States Patent
Finster et al.

(10) Patent No.: US 12,132,822 B2
(45) Date of Patent: Oct. 29, 2024

(54) PROTECTING THE INTEGRITY OF MEASUREMENT DATA ACQUIRED BY A SENSOR DEVICE

(71) Applicant: ABB Schweiz AG, Baden (CH)

(72) Inventors: Soeren Finster, Karlsruhe (DE); Florian Kohnhaeuser, Riedstadt (DE)

(73) Assignee: ABB Schweiz AG, Baden (CH)

( * ) Notice: Subject to any disclaimer, the term of this patent is extended or adjusted under 35 U.S.C. 154(b) by 327 days.

(21) Appl. No.: 17/523,013

(22) Filed: Nov. 10, 2021

(65) Prior Publication Data

US 2022/0158827 A1   May 19, 2022

(30) Foreign Application Priority Data

Nov. 17, 2020  (EP) .................. 20 208 137

(51) Int. Cl.
*H04L 9/08*   (2006.01)
*G06F 8/65*   (2018.01)
*H04L 9/32*   (2006.01)

(52) U.S. Cl.
CPC .............. *H04L 9/0819* (2013.01); *G06F 8/65* (2013.01); *H04L 9/3247* (2013.01)

(58) Field of Classification Search
CPC ...... G05B 23/0221; G05B 2219/25423; G06F 21/57; G06F 21/64; G06F 8/65;
(Continued)

(56) References Cited

U.S. PATENT DOCUMENTS 10,263,841 B1 *  4/2019  Stamatakis ............. H04W 4/70
10,318,754 B2 *  6/2019  Yavuz ................... H04L 9/3247
(Continued)

FOREIGN PATENT DOCUMENTS

CN   104967517 B   3/2018
CN   109981289 A   7/2019
(Continued)

OTHER PUBLICATIONS

Haojin Zhu et al., "An Opportunistic Batch Bundle Authentication Scheme for Energy Constrained DTNs," 2010 Proceedings IEEE Infocom, Mar. 2010, pp. 1-8, San Diego, CA, USA.
(Continued)

*Primary Examiner* — Greg C Bengzon
(74) *Attorney, Agent, or Firm* — Leydig, Voit & Mayer, Ltd.

(57) ABSTRACT

A method for protecting the integrity of measurement data acquired by a sensor includes: in response to the measurement data being acquired, determining, by the sensor, whether an aggregate value has already been generated, and: if the aggregate value has not yet been obtained, mapping, by a predetermined aggregation function that takes the measurement data as a mandatory argument and a previously generated aggregate value as an optional argument, the measurement data to the aggregate value; whereas if the aggregate value has already been obtained, mapping, by the predetermined aggregation function, the combination of the aggregate value and the measurement data to a new aggregate value; and in response to a predetermined condition being met, computing, using a secret key of the sensor, a signature of the aggregate value; and outputting the signature via a communication interface of the sensor, and/or storing the signature in a memory.

10 Claims, 2 Drawing Sheets

(58) Field of Classification Search
CPC .... G06F 3/0604; G06F 3/0659; G06F 3/0679;
G06F 16/24556; G06F 16/24569; G06F
16/2462; G06F 3/067; G06F 3/0688;
G06F 21/6263; G06F 21/6254; G06F
21/6236; G06F 21/6227; G06F 11/3006;
G06F 11/301; G06F 11/3048; G06F
11/3051; G06F 11/3055; G06F 11/3062;
G06F 11/3068; G06F 11/3072; G06F
11/3075; G06F 11/3079; G06F 11/3082;
G06F 11/3086; G06F 11/34; G06F
11/3452; G06F 11/3476; G06F 11/3485;
G06F 11/349; G06F 11/3495; H04L
63/123; H04L 9/0819; H04L 9/3242;
H04L 9/3247; H04L 67/12; H04L 67/10;
H04L 41/12; H04L 63/0823; H04L
2209/805; H04L 9/3239; H04L 41/122;
H04L 41/5003; H04L 67/04; H04L
67/566; H04L 9/3297; H04L 9/50; H04L
9/3263; H04L 9/3268; H04L 63/126;
H04L 63/18; H04L 9/3236; H04L
2209/26; H04L 2209/30; H04L 63/12;
H04L 67/104; H04L 67/2895; H04L
67/5651; H04L 67/567; H04L 67/568;
H04L 9/0825; H04L 63/00; H04L
63/0236; H04L 9/0637; H04L 9/088;
H04L 9/0891; H04L 41/085; H04L 41/28;
H04W 4/70; H04W 4/50; H04W 8/183;
H04W 12/069; H04W 12/106; H04W
12/61; H04W 4/38; H04W 84/18; H04W
8/18; H04W 12/108; H04W 12/48; H04W
4/48; H04W 88/06; G16Y 20/00; G16Y
20/10; G16Y 40/10; G16Y 40/20
See application file for complete search history.

(56) References Cited

U.S. PATENT DOCUMENTS

| | | | | |
|---|---|---|---|---|
| 10,846,372 | B1* | 11/2020 | Jayachandran | ....... H04L 9/3239 |
| 2013/0047197 | A1* | 2/2013 | Saroiu | ................. G06F 9/45558 |
| | | | | 726/1 |
| 2017/0063812 | A1* | 3/2017 | Dash | ..................... H04L 9/0869 |
| 2017/0085539 | A1* | 3/2017 | Wishard | .................. H04L 67/12 |
| 2017/0244567 | A1* | 8/2017 | Smeets | ................. H04L 9/3268 |
| 2017/0311822 | A1* | 11/2017 | Macneil | ............. A61B 5/02405 |
| 2018/0337899 | A1* | 11/2018 | Becker | .................. H04L 9/0825 |
| 2019/0044726 | A1* | 2/2019 | Macieira | ................. H04L 67/04 |
| 2019/0334769 | A1* | 10/2019 | Stamatakis | ............. H04L 67/12 |
| 2020/0026253 | A1* | 1/2020 | Fuhr | ..................... H04L 9/3297 |
| 2021/0003426 | A1* | 1/2021 | Benton | ............... H04L 67/1097 |
| 2021/0190354 | A1* | 6/2021 | Llopis | ...................... F24F 11/49 |
| 2021/0326441 | A1* | 10/2021 | Falk | ......................... H04L 9/32 |
| 2022/0107929 | A1* | 4/2022 | Falco | .................... H04L 63/123 |

FOREIGN PATENT DOCUMENTS

| | | |
|---|---|---|
| EP | 0549070 A1 | 6/1993 |
| WO | WO 2019086969 A1 | 5/2019 |
| WO | WO 2020083732 A1 | 4/2020 |

OTHER PUBLICATIONS

Anonymous, "TCG Specification Architecture Overview—Revision 1.4," Aug. 2007, pp. 1-54, TCG 2003, Beaverton, Oregon, United States.

Akshay Dua et al., "Towards Trustworthy Participatory Sensing," Jan. 2009, pp. 1-6, CSIRO ICT Centre, Australia.

* cited by examiner

PROTECTING THE INTEGRITY OF MEASUREMENT DATA ACQUIRED BY A SENSOR DEVICE

CROSS-REFERENCE TO PRIOR APPLICATION

Priority is claimed to European Patent Application No. EP 20 208 137.8, filed on Nov. 17, 2020, the entire disclosure of which is hereby incorporated by reference herein.

FIELD

One or more embodiments of the present invention may relate to the authentication of measurement data that are acquired by sensor devices and transmitted over process control networks.

BACKGROUND

Automated industrial plans typically comprise many field devices that are in a direct relationship with an industrial production process. Many of these field devices comprises sensors that are used to acquire measurement data. The measurement data is transmitted over a process control network to a server or other entity that stores and/or evaluates the measurement data.

Some acquired measurement data is critical in the sense that financial gain might be derived from a deliberate forgery of this measurement data, so it needs to be protected against such forgery. For example, sensor devices may be used to monitor compliance of an industrial plant with environmental regulations. Also, industrial processes may use controlled substances that require permits to handle and must be accounted for end-to-end. If such measurement data is forged, this may allow operation of the plant in violation of environmental regulations for more profit, or the theft of the controlled substance.

WO 2019/086 969 A1 discloses techniques for establishing secure communication between a condition monitoring device of an electrical machine and a portable device for monitoring condition of the electrical machine. From measurements of electrical and/or mechanical parameters of the machine, an encryption key for securing the communication between the condition monitoring device and the portable device.

Cryptographic operations are expensive in terms of computing resources, which tend to be limited on the side of the field device.

SUMMARY

One or more embodiments of the present invention may provide a method for protecting the integrity of measurement data acquired by a sensor. The method may include: in response to the measurement data being acquired, determining, by the sensor, whether an aggregate value has already been generated, and: if the aggregate value has not yet been obtained, mapping, using a predetermined aggregation function that takes the measurement data as a mandatory argument and a previously generated aggregate value as an optional argument, the measurement data to the aggregate value; whereas if the aggregate value has already been obtained, mapping, using the predetermined aggregation function, the combination of the aggregate value and the measurement data to a new aggregate value; and in response to a predetermined condition being met, computing, using a secret key of the sensor, a signature of the aggregate value; and outputting the signature via a communication interface of the sensor, and/or storing the signature in a memory.

An objective of one or more embodiments of the present invention may be to ensure the authenticity of measurement data that are acquired by a sensor device with a lesser consumption of computing resources on the side of the sensor device.

This objective may be achieved by a method for protecting the integrity of measurement data and by a corresponding method for authenticating so-protected measurement data.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
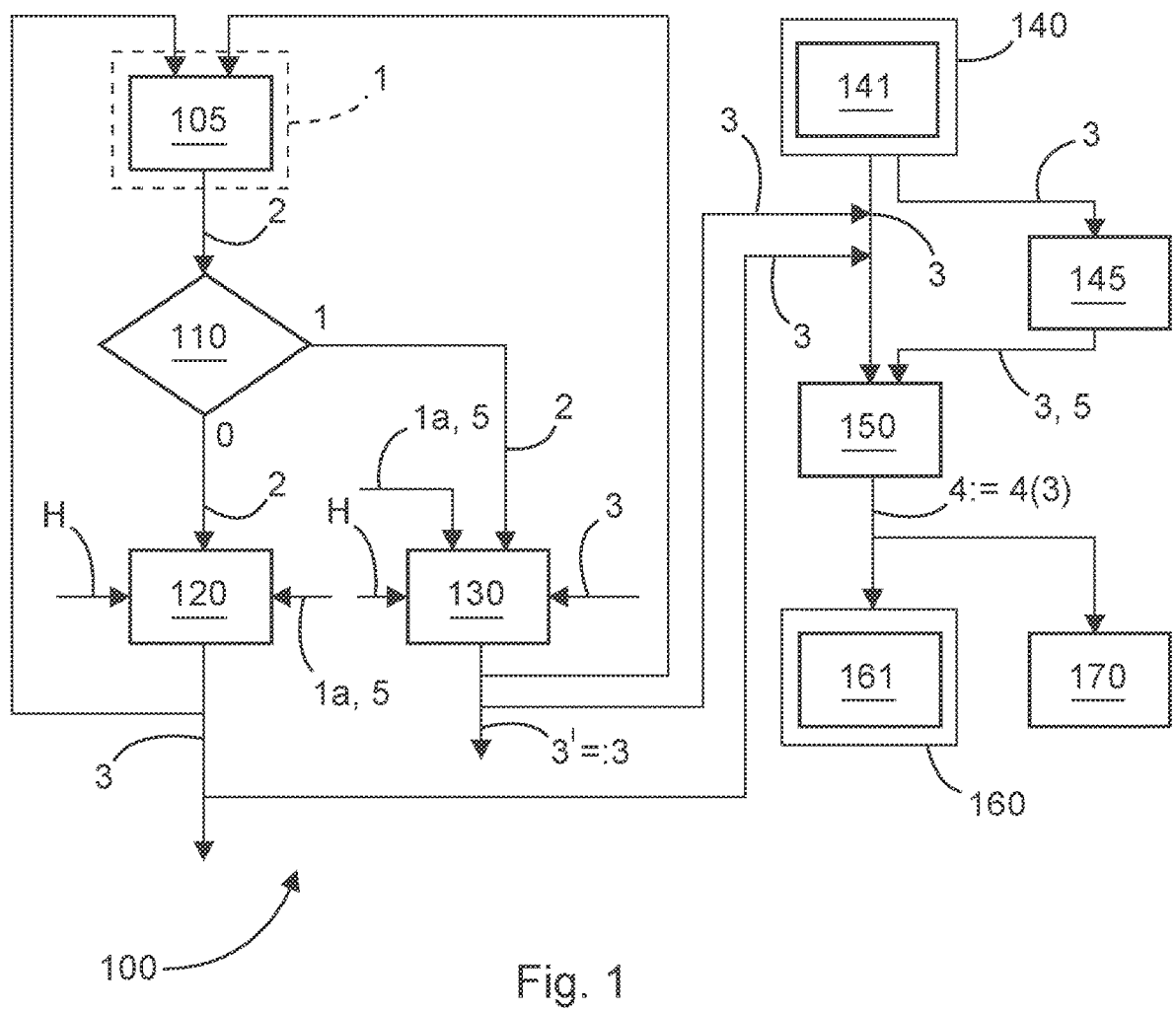
FIG. 1: Exemplary embodiment of a method for protecting the integrity of measurement data.

One or more embodiments of the present invention may provide a method for protecting the integrity of measurement data acquired by a sensor device. This method comprises computing aggregate values of measurement data by means of a predetermined aggregation function that takes measurement data as a mandatory argument and a previously generated aggregate value as an optional argument.

Specifically, in response to new measurement data being acquired, the sensor device determines whether an aggregate value has already been generated. If an aggregate value has not yet been obtained, a new aggregate value is created by feeding the measurement data to the aggregation function. If there already is an aggregate value, this is fed to the aggregation function together with the new measurement data to obtain an updated aggregate value.

This process may continue until a predetermined condition is met. Such predetermined condition may, for example, comprise that:

a predetermined time period has expired; and/or
a new aggregate value has been generated for a predetermined number of times; and/or
the sensor device has received a request for a signature from another device; and/or
a previous computation of a signature has finished.

If the predetermined condition is met, the sensor device computes a signature of the aggregate value using a secret key of the sensor device. This signature is outputted via a communication interface of the sensor device, and/or it is stored in a memory. Such memory may reside inside or outside the sensor device. After that, the aggregate value may be cleared, and with the next acquired measurement data, a new aggregate value may be created.

Here, "secret" is not to be considered limiting with respect to the encryption scheme. The encryption scheme used for signing may be symmetric, so that the signature may be verified with the same secret key. The encryption scheme used for signing may also be asymmetric, so that the signature may be verified with a public key corresponding to the secret key. Thus, a "secret key" is merely a key that no unauthorized third party has access to, and may belong to any suitable encryption scheme.

The inventors have found that the signing operation is a much more computationally expensive operation than the updating of the aggregate value. For example, in a typical constellation, the updating of a hash value as an aggregate value may take on the order of milliseconds, whereas the signing of such a hash value may take on the order of seconds. Therefore, much resource consumption may be saved by aggregating a number of measurement values and then signing the aggregate value. If the signature of the aggregate value is successfully verified, this means that all the measurement values that have gone into this aggregate value are authentic. If the signature is not successfully verified, this means that one or more of those measurement values may have been corrupted and/or tampered with.

Therefore, the number of measurement values that goes into the aggregate value may be used to set a trade-off between the saving of computing resources on the one hand, and the temporal resolution with which invalid measurement values may be pinpointed on the other hand.

For example, while the measurement values may be needed at a quite frequent pace for the purpose of ad-hoc process control, a need to authenticate the measurement values may arise only infrequently. For example, if the measurement data represent emissions of pollution or the whereabouts of controlled substances, a need to authenticate them may only arise upon a spot check by the regulatory authority. For such a purpose, it may be sufficient to combine several hours, or even an entire day, of measurement values into one single aggregate value that is then signed.

Reducing the number of times that a signature has to be computed is only one contribution to the savings in computing resources. The computational expense also depends on the volume of the data to be signed. The aggregating of the measurement data greatly reduces this volume of data to be signed.

In particular, starting computation of a new signature in response to a previous computation of a signature having finished allows to compute signatures solely using CPU cycles that would otherwise have been spent in an idle state. Whenever the CPU of the sensor device has nothing else to do, it continues working on the computation of a signature for an aggregate value that has previously been formed. As soon as the CPU is needed for something else, this computation is interrupted, to be resumed later when the CPU is idle again. Meanwhile, a next aggregate value is already being formed using the measurement data that continues to accrue. It is not known in advance when the computation of the signature will finish; it is only certain that it will finish at some time, depending on the utilization of the CPU of the sensor device. When the computation finishes, computation of the next signature on the next aggregate value available at that time may be started.

As it will be illustrated in further detail in the discussion of the corresponding method for authenticating measurement data, a measurement value cannot be authenticated individually. Rather, at least one aggregate value in which the measurement value is comprised needs to be re-computed, and a signature obtained from whatever source needs to be verified based on the assumption that this re-computed aggregated value was what was actually signed by the sensor device. That is, part of the burden of ensuring the authenticity of the measurement data is shifted from the sensor device that produces a signature to the device that later authenticates a given set of measurement data using a given signature.

In a particularly advantageous embodiment, the aggregating function is a hash function that maps measurement data, or a combination of the measurement data with one or more further arguments, to a hash value of fixed size as an aggregate value. Preferably, such a hash function is cryptographically secure in the sense that it is very hard to find two distinct input values that are mapped to the same output value by the hash function. If the signature of such a hash value is successfully verified, this is an even better guarantee that all the measurement data that has gone into this hash value is authentic.

In a further particularly advantageous embodiment, the aggregating function further takes configuration information of the sensor device as a further argument. This configuration information controls the behavior of the sensor device, and/or the acquiring of measurement data by the sensor device. In this manner, successful verification of the signature of the aggregate value also ensures that the configuration of the sensor device was in a certain defined state at the time the measurement data was acquired.

To permit a verification of the signature, the configuration information may, for example, be communicated from the sensor device to a device that authenticates the measurement data, or stored in a place where such authenticating device can retrieve it. But this is not required. Rather, the authenticating device may also compute the aggregate value and verify the signature based on nominal and/or expected values of the configuration information. For example, when setting up the sensor device using certain configuration information, this configuration information may be saved for later verification of signatures.

In this manner, it may also be detected if the configuration of the sensor device deviates from a certain expected or nominal state, intentionally or unintentionally. Such deviation may cause measurement values not to be comparable to previously acquired measurement values in a meaningful manner.

For example, in a setting where bacteria and/or biological enzymes are harnessed to produce a desired chemical compound, the concentration of the bacteria or enzymes may not be measurable directly. Rather, such concentration may be measured indirectly in terms of the activity that unfolds on a test reagent when a sample containing the bacteria and/or enzymes is brought in contact with the test reagent. This is a particularly sensitive way of determining the concentration of enzymes because a unit of enzyme is not "used up" when catalyzing a reaction in one unit of the test reagent. Rather, one and the same unit of enzyme may be used over and over for catalyzing reactions in further units of the test reagent, resulting in a large amplification of the measurement signal. A critical parameter in such an activity measurement is the temperature at which the measurement is performed. One and the same enzyme may exhibit a lot more activity at 37° C. than at 20° C. Therefore, if the reaction temperature in the sensor device should normally be set to 20° C. and the further processing of the measurement data is based on the assumption that the reaction temperature is 20° C., a configuration of the sensor device to a reaction temperature of 37° C. will cause measurement values with the correct measurement unit to be outputted, but the interpretation of these measurement values will be wrong.

In further embodiments, the configuration may comprise one or more of:

a measurement range of the sensor device;

a measurement unit used by the sensor device;

a schedule according to which the sensor device acquires measurement data;

one or more processing steps that the sensor device applies to at least one sensor signal, and/or to the measurement data; and at least part of a firmware of the sensor device, and/or a hash value computed thereon.

For example, attempts to deliberately disguise overly high emissions of pollutants or a theft of a controlled substance may comprise altering the schedule of the measurements in order to create a suitable temporal "blind spot". Also, a manipulation of the firmware may be used for the same purpose.

But the inclusion of configuration information in the computation of the aggregate value may also help to detect accidental configuration changes. For example, an operator who physically visits the sensor device in the plant and wishes to have the current temperature measurement values displayed in Kelvin rather than in ° C. may press the wrong key that switches the data acquisition, rather than just the display, from ° C. to Kelvin. If the temperature to be monitored is a rather high absolute temperature, like the temperature inside a furnace, the wrong value that is off by 273,15 K might still appear plausible at first sight.

In a further particularly advantageous embodiment, the predetermined condition that triggers the computing of a signature may be made dependent on a utilization of at least one processing resource of the sensor device that is needed for the computing of a signature. In this manner, signatures may be computed as often as it is possible without disturbing the primary function of the sensor device.

For example, the sensor device may also comprise one or more actors that act upon the industrial process in which measurement data are acquired. For example, a stirrer process module may comprise multiple valves for feeding educts into a reaction vessel and draining product from this vessel, a motor for driving a stirrer inside the vessel, a heater for heating the vessel to a desired temperature, and also a thermometer for sensing the temperature inside the vessel, all orchestrated by a single CPU. There may be times at which the process is running without an acute need for action, so that the CPU is almost idle and most of its capacity may be used for computing signatures. But there may also be times at which the CPU is very busy with orchestrating various actions in the stirrer module, so only 20% or even less of the CPU's capacity may be available for computing signatures. In this case, for example, the time interval at which signatures are computed may be made longer.

In a further advantageous embodiment, the aggregation function may take an epoch index as a further argument. This epoch index may, for example, initially start out at 0 or 1. It is incremented each time the predetermined condition is met and a signature is computed. This may, for example, be used to check whether measurement data that is submitted for authentication is complete, making it harder to suppress a portion of the measurement data.

In the example of emission monitoring, if there is a time period during which a pollution above the regulatory limit is emitted, an attempt might be made to just make the measurement data gathered during this time period "disappear" as if it had never been there.

In another example, pharmaceutical compounds or other substances in their purest form may have an astronomical value per unit volume (up to several 100,000 € for a single beaker of substance), but that value may be lost instantly if the prescribed manufacturing protocol is violated. For example, if the substance has been heated too hot in one of the processing steps of the manufacturing protocol, it is no longer fit for medical use and must be discarded. In case of such a mishap, it may appear financially attractive to just "forget" about it and continue processing the substance as if nothing happened.

Such manipulation is made considerably harder if an epoch index goes into the computation of the aggregate value. If the measurement data is supplied for inspection, and the data comprises records associated with epoch indices 1, 2, 3 and 5, it is immediately apparent that records with epoch index 4 are missing, so something is not right. One could try to disguise this by changing the epoch index of the last part of the measurement data from 5 to 4. But then the verification of the signature would always fail because the aggregate value computed for verifying the signature would be different from the aggregate value that was actually signed. The signature can only be verified successfully if everything that has gone into the computation of the aggregate value that was signed—measurement data, configuration information, epoch index, and whatever else—is exactly the same when the aggregate value is later reconstructed and it is checked whether this aggregate value has been validly signed.

In a further particularly advantageous embodiment, the communication interface of the sensor device that is used for outputting the signature is configured to output data from the sensor device, but not configured to accept the inputting of data to the sensor device. In this manner, the communication interface cannot be misused to maliciously take over control of the sensor device by deliberately sending invalid data to the sensor device. For example, an attacker might attempt to send more data to the sensor device than it expects in order to trigger a "buffer overflow" attack and execute arbitrary code on the sensor device. The attacker might also strive for such a goal by supplying out-of-bounds values, such as a timestamp with a minute field above 60 or a negative set-point for the rotation speed of a stirrer. Every software that accepts untrusted input is in principle vulnerable to such attack unless each and every untrusted input is properly sanitized prior to use.

For example, the communication interface may encode data that is outputted from the sensor device in a value of the current that the communication interface, and/or the sensor device, draws from a current loop, such as a 4-20 mA current loop. There is no way of feeding back information to the sensor device on such an interface.

The sensor device may output, through the communication interface, at least part of the data from which the sensor device computes aggregate values. This data may comprise the measurement data, configuration data, epoch indices, and any other information that has gone into the aggregate values that were then signed. But a device that authenticates given measurement data based on a given signature may obtain all these pieces of information from whatever source, even from multiple sources. For example, the measurement values may be obtained from some memory where the sensor device previously put them, but the signature on some aggregate value may be created later on demand by the sensor device.

One or more embodiments of the present invention may also provide a method for authenticating measurement data that has been acquired by a sensor device and protected using the method described before. That is, a given signature that has been generated for some aggregate value derived from this measurement data is available.

The method therefore starts with obtaining the measurement data and at least one signature of an aggregate value that depends on this measurement data. Based at least in part on the measurement data, the aggregate value is reconstructed. That is, to the measurement data and all the other information that has gone into the determining of the aggregate value on the side of the sensor device, the same predetermined aggregation function is applied that was also applied on the side of the sensor device.

The signature is verified against the reconstructed aggregate value. That is, it is determined whether the obtained signature is a valid signature of the reconstructed aggregate value. This means that if either the reconstructed aggregate value does not correspond to the aggregate value that was previously obtained on the side of the sensor device, or the signature was not made with the correct secret key of the sensor device, the verification of the signature will fail. The signature verification may be performed using the same secret key that was used on the side of the sensor device if the signature algorithm is symmetric, or with a public key corresponding to the secret key of the sensor device if the signature algorithm is asymmetric.

If the verification of the signature is successful, it is determined that the measurement data is authentic.

In a particularly advantageous embodiment, the reconstructing is based at least in part on candidate values for the measurement data and/or for further arguments from which the aggregate value is derived. If the signature verification is not successful, new candidate values are determined, and a new aggregate value is reconstructed based at least in part on the new candidate values.

That is, it is not known for sure what exactly has gone into the aggregate value that was then signed, and one or more guesses to this effect have to be made.

For example, it may not be known exactly how many measurement values have been aggregated to form an aggregate value on the side of the sensor device. It may be any number between 2 and 100 measurement values. An aggregate value may then be reconstructed first from 2 measurement values, then from 3 measurement values, and so on until the given signature can be successfully verified on such an aggregate value. Once the signature is successfully verified, this indicates at the same time how many measurement values were aggregated on the side of the sensor device.

In particular, such a situation may arise if the computation of signatures on the side of the sensor device is performed "back to back"; i.e., a computation of a new signature using otherwise idle CPU cycles is started as soon as the previous computation has finished. The authenticating device has no way of knowing which measurement values went into the signed aggregate value, because this depends on the utilization of the CPU of the sensor device. So the authenticating device needs to try candidate compositions of measurement values until the signature eventually verifies successfully.

An analogous process may be performed with epoch indices or with configuration information of the sensor device that has gone into the aggregate value. For example, if a thermometer may be configured to measure in either ° C., Kelvin or ° F., then an aggregate value may be determined first for a configuration to measure in ° C., then for a configuration to measure in Kelvin, and then for a configuration to measure in ° F.

If there are multiple constituents of the aggregate value for which respective candidate values need to be probed, these constituents may span a multi-dimensional search space that may need to be exhaustively searched until the signature is successfully verified. But this search may be performed by an arbitrarily powerful computing system that receives the measurement data and the signature. By contrast, the sensor device that generates the signature typically has very limited computing capabilities. One reason is that an industrial plant typically comprises a very large number of sensor devices, so the extra cost of equipping a sensor device with more computing power is multiplied by this large number of devices. Another reason is energy consumption. Sensor devices that output their measurement values by means of the current they draw from a current loop are also powered by that current loop. In a 4-20 mA current loop system, this means that at times, there may be only 4 mA available to power the entire sensor device. Energy is even scarcer in wireless sensor devices that are battery powered.

Thus, it makes sense to have a small burden for generating the signature on the side of the sensor device (just perform any aggregation and sign that) and shift the larger part of the burden (search for the constellation for which the aggregate value was determined) to the device that authenticates the measurement data.

The methods described here may be embodied in a software that may be loaded onto a sensor device, a process controller or any other suitable computing device. One or more embodiments of the present invention therefore may also relate to a computer program with machine-readable instructions that, when executed by one or more computers, upgrade the one or more computers to the interface device described above.

The computer program may, for example, be marketed on a non-transitory computer-readable storage medium or in the form of a download product that, e.g., allows instant fulfillment after a purchase in an online store. Therefore, one or more embodiments of the invention may also relate to a non-transitory computer-readable storage medium or a download product with the computer program. One or more embodiments may also relate to one or more computers with the computer program, and/or with the non-transitory computer storage medium and/or download product.

FIG. 1 is a schematic flow chart of an embodiment of the method 100 for protecting the integrity of measurement data 2.

The method 100 reacts to the event 105 that a record of measurement data 2 has been acquired by a sensor device 1. In step 110, it is then determined by the sensor device 1 whether an aggregate value 3 of records of measurement data 2 has already been generated. If this is not the case (truth value 0), the measurement data 2, optionally together with configuration information 1a of the sensor device 1 and/or a running epoch index 5, is mapped, by means of a predetermined aggregation function H, to a newly generated aggregate value 3 that at this time relates to only one single record of measurement data 2. If, however, an aggregate value 3 already exists (truth value 1 at diamond 110), then the same aggregation function H is used in step 130 to update the aggregate value 3. That is, an aggregate value 3 that previously related to n records of measurement data 2 is transformed into a new aggregate value 3' that relates to n+1 records of measurement data 3. Akin to step 120, if an epoch index 5 is used, this may go into the updated aggregate value 3' as well. Likewise, configuration information 1a of the sensor device 1 may go into the updated aggregate value 3'. If this configuration information 1a has been updated since the last update of the aggregate value 3, such updated configuration information 1a may be used.

The method 100 also reacts to the event 140 that a predetermined condition is met, such as expiry of a predetermined time period, generation of a certain number of new aggregate values 3', or a specific request for a signature 4 from another device 10 that wishes to authenticate the measurement data 2. According to block 141, the predetermined condition, such as the time period or the number of new aggregate values 3', may be dependent on the utilization of a processing resource of the sensor device 1 that is needed for the computing of a signature 4.

If a running epoch index 5 is used, this may be updated in block 145 in response to the predetermined condition being met.

In step 150, a signature 4 of the aggregate value 3 is computed using a secret key of the sensor device 1. This signature 4 may then be outputted via a communication interface of the sensor device 1 in step 160, and/or stored in a memory inside or outside the sensor device 1 in step 170. For the purpose of authenticating the measurement data 2 later on, it is only important that a device 10 that shall perform such authenticating gets hold of the measurement data 2 and the signature 4 from whatever source. According to block 161, other information that has gone into the aggregate value 3, such as an epoch index 5 or configuration information 1a, may be outputted as well to aid the authenticating.

Figure 2:
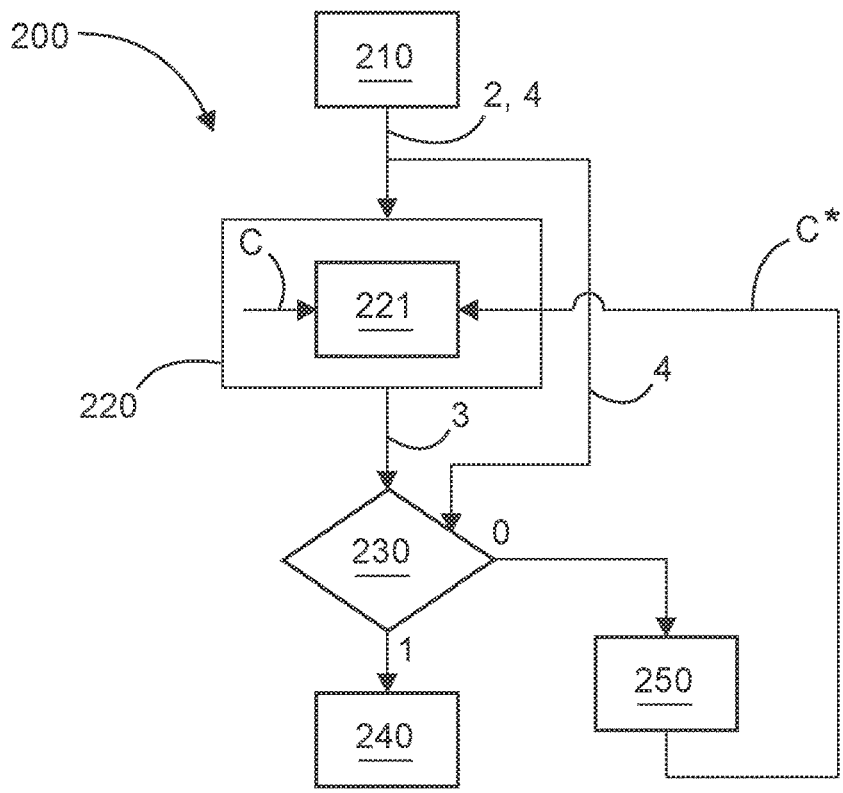
FIG. 2: Exemplary embodiment of a method for authenticating measurement data.

FIG. 2 is a schematic flow chart of the method 200 for authenticating measurement data 2 that has been protected using the method 100 described above. In step 210, the measurement data 2 and at least one signature 4 of an aggregate value 3 that depends on this measurement data 2 are obtained. In step 220, the aggregate value 3 is reconstructed based at least in part on the measurement data 2. Theoretically, the aggregate value 3 could be obtained from whatever source in step 210 as well and immediately used instead of reconstructing it. However, always reconstructing the aggregate value 3 in step 220 is better for security because this reconstructing proves that the aggregate value 3 actually belongs to the supplied measurement data 2. With such proof, successful verification of the signature 4 against the aggregate value 3 also implies the sought authenticity of the measurement data 2.

In step 230, the signature 4 is verified against the aggregate value 3. If this verification is successful (truth value 1), it is determined in step 240 that the measurement data 2 is authentic.

According to block 221, the reconstructing 220 of the aggregate value 3 may be based on candidate values C for the measurement data 2 and/or for further arguments from which the aggregate value 3 is derived. That is, if some of this information is not known for sure, it may be searched for by trying candidate values C: If the verification fails (truth value 0 at diamond 230), then new candidate values C* may be determined in step 250. These new candidate values C* may be fed back to the reconstructing of the aggregate value 3 in block 221, so that a new aggregate value results. The given signature 4 can then be verified against this new candidate value 3.

Figure 3:
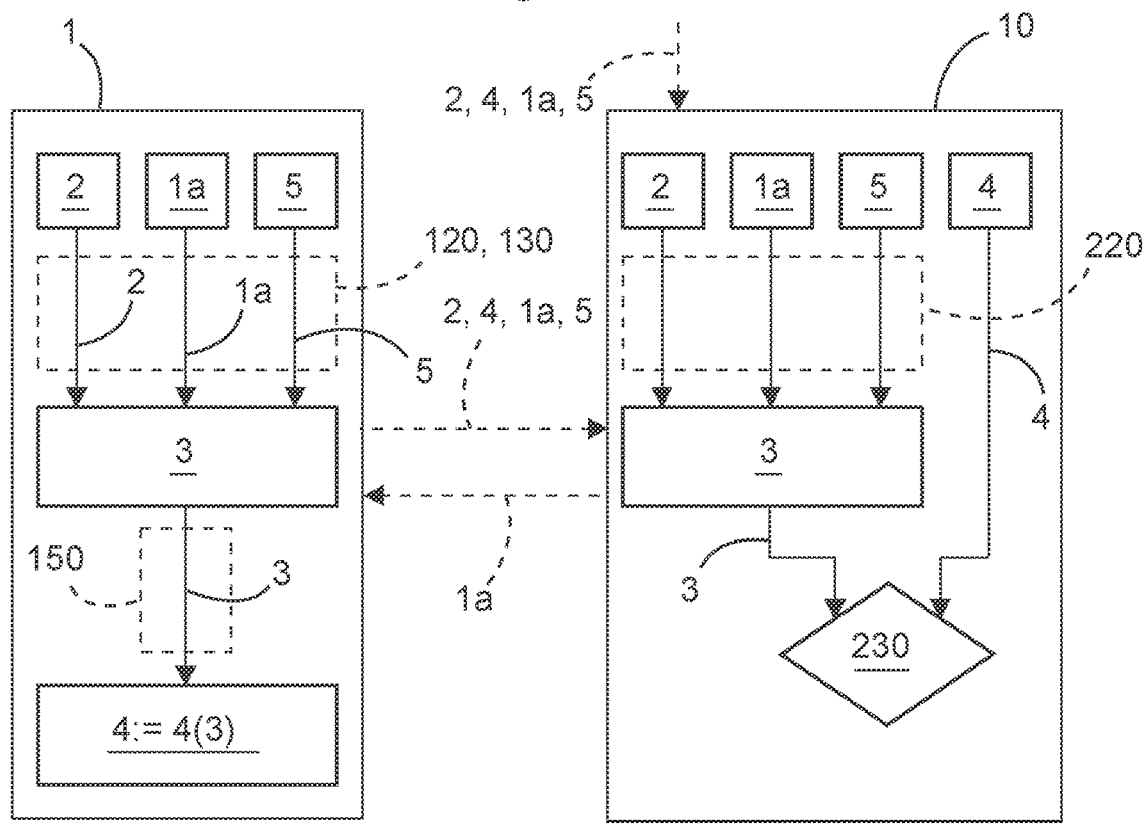
FIG. 3: Exemplary cooperation between a sensor device and a device that authenticates measurement data.

FIG. 3 illustrates the cooperation of a sensor device 1 and a device 10 that is to authenticate measurement data 2. As illustrated in FIG. 3 and discussed before in detail, the sensor device 1 computes an aggregate value 3 from records of measurement data 2, configuration information 1a of the sensor device, and a running epoch index 5 as per steps 120 and 130 of method 100. The sensor device 1 computes the signature 4 of this aggregate value 3 using its secret key as per step 150 of method 100.

The measurement data 2 and the signature 4 may be supplied from the sensor device 1 to the device 10 that wishes to authenticate the measurement data 2. The same applies to the configuration information 1a and to the epoch index 5. This may serve as an aid to the authenticating of the measurement data 2, but it is not required. Rather, the device 10 that wishes to authenticate the measurement data 2 may obtain all the information from any source. After all, it is a major benefit of the authentication that successfully authenticated measurement data 2 may be freely used even if they come from an untrusted source. The configuration information 1a may even be supplied from the authenticating device 10 to the sensor device 1, for example, if the authenticating device 10 is a process controller that is connected to the same network as the sensor device 1.

As discussed before, in the authenticating device 10, the aggregate value 3 is reconstructed from the measurement data 2, the configuration information 1a and the epoch index 5 as per step 220 of the method 200. The signature 4 is then verified against the reconstructed aggregate value 3 as per step 230 of the method 200.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 sensor device
1a configuration information of sensor device 1
2 measurement data
3, 3' aggregate value
4 signature of aggregate value 3
5 epoch index
10 authenticating device
100 method for protecting integrity of measurement data 2
105 acquiring of measurement data 2
110 determining whether aggregate value 3 already exists
120 creating new aggregate value 3
130 updating existing aggregate value 3
140 meeting predetermined condition
141 varying predetermined condition based on resource utilization 145 updating epoch index 5
150 computing signature of aggregate value 3
160 outputting signature via interface
161 outputting information with which aggregate value 3 was computed
170 storing signature 4
200 method for authenticating measurement data 2
210 obtaining measurement data 2 and signature 4
220 reconstructing aggregate value 3
221 reconstructing based on candidate values C, C*
230 verifying signature 4 against reconstructed aggregate value 3
240 determining that measurement data 2 is authentic
250 determining new candidate values C*
C, C* candidate values
H aggregation function

What is claimed is:

1. A method for protecting the integrity of measurement data acquired by a sensor, the method comprising:
   in response to the measurement data being acquired, determining, by the sensor, whether an aggregate value has already been generated, and:
      if the aggregate value has not yet been obtained, mapping, using a predetermined aggregation function that takes the measurement data as a mandatory argument and a previously generated aggregate value as an optional argument, the measurement data to the aggregate value; whereas
      if the aggregate value has already been obtained, mapping, using the predetermined aggregation function, the combination of the aggregate value and the measurement data to a new aggregate value; and
   in response to a predetermined condition being met,
      computing, using a secret key of the sensor, a signature of the aggregate value; and
      outputting the signature via a communication interface of the sensor, and/or
      storing the signature in a memory,
   wherein the predetermined condition is made dependent on a utilization of at least one processing resource of the sensor that is needed for the computing of a signature.

2. The method of claim 1, wherein the aggregating function is a hash function that maps the measurement data, or a combination of the measurement data with one or more further arguments, to a hash value of fixed size as the aggregate value.

3. The method of claim 1, wherein the aggregating function further takes configuration information of the sensor as a further argument, wherein said configuration information controls a behavior of the sensor, and/or the acquiring of the measurement data by the sensor.

4. The method of claim 3, wherein the configuration information comprises one or more of:
   a measurement range of the sensor;
   a measurement unit used by the sensor;
   a schedule according to which the sensor acquires the measurement data;
   one or more processing steps that the sensor applies to at least one sensor signal, and/or to the measurement data; and
   at least part of a firmware of the sensor, and/or a hash value computed thereon.

5. The method of claim 1, wherein the predetermined condition comprises:
   a predetermined time period has expired; and/or
   a new aggregate value has been generated for a predetermined number of times; and/or
   the sensor has received a request for a signature from another device; and/or
   a previous computation of a signature has finished.

6. The method of claim 1, wherein the aggregation function takes an epoch index as a further argument, and wherein the method further comprises, in response to the predetermined condition being met: incrementing the epoch index.

7. A method for protecting the integrity of measurement data acquired by a sensor, the method comprising:
   in response to the measurement data being acquired, determining, by the sensor, whether an aggregate value has already been generated, and:
      if the aggregate value has not yet been obtained, mapping, using a predetermined aggregation function that takes the measurement data as a mandatory argument and a previously generated aggregate value as an optional argument, the measurement data to the aggregate value; whereas
      if the aggregate value has already been obtained, mapping, using the predetermined aggregation function, the combination of the aggregate value and the measurement data to a new aggregate value; and
   in response to a predetermined condition being met,
      computing, using a secret key of the sensor, a signature of the aggregate value; and
      outputting the signature via a communication interface of the sensor, and/or
      storing the signature in a memory,
   wherein the communication interface of the sensor that is used for outputting the signature is configured to output data from the sensor, but not configured to accept the inputting of data to the sensor.

8. The method of claim 7, wherein the communication interface encodes data that is outputted from the sensor in a value of the current that the communication interface, and/or the sensor, draws from a current loop.

9. The method of claim 1, further comprising outputting, through the communication interface, at least part of the data from which the sensor computes aggregate values.

10. A method for authenticating acquired measurement data comprising:
    acquiring, by a sensor, measurement data;
    protecting the integrity of the acquired measurement data by:
       responding to the measurement data being acquired by determining, by the sensor, whether an aggregate value has already been generated, and:
          if the aggregate value has not yet been obtained, mapping, using a predetermined aggregation function that takes the measurement data as a mandatory argument and a previously generated aggregate value as an optional argument, the measurement data to the aggregate value; whereas
          if the aggregate value has already been obtained, mapping, using the predetermined aggregation function, the combination of the aggregate value and the measurement data to a new aggregate value; and
       in response to a predetermined condition being met,
          computing, using a secret key of the sensor, a signature of the aggregate value; and
          outputting the signature via a communication interface of the sensor, and/or
          storing the signature in a memory;

obtaining the measurement data and at least one signature of an aggregate value that depends on the measurement data;
reconstructing, based at least in part on the measurement data, the aggregate value;
verifying the signature against the reconstructed aggregate value; and
if the verification is successful, determining that the measurement data is authentic,
wherein the reconstructing is based at least in part on candidate values for the measurement data and/or for further arguments from which the aggregate value is derived, and wherein the method further comprises: if the verification is not successful, determining new candidate values and reconstructing a new aggregate value based at least in part on the new candidate values.

* * * * *